United States Patent [19]
Ligutti et al.

[11] 4,312,978
[45] Jan. 26, 1982

[54] PROCESS FOR THE PREPARATION OF UNSATURATED POLYESTERS ADAPTED FOR THE PRODUCTION OF UNSATURATED POLYESTER RESINS

[75] Inventors: Marzio Ligutti; Elvio Bertotti, both of Colleferro, Italy

[73] Assignee: Snia Viscosa S.p.A., Milan, Italy

[21] Appl. No.: 143,419

[22] Filed: Apr. 24, 1980

[30] Foreign Application Priority Data

May 11, 1979 [IT] Italy .............................. 22579 A/79

[51] Int. Cl.³ ............................................. C08G 63/66
[52] U.S. Cl. .................................... 528/300; 528/274; 528/283; 528/303; 528/306; 528/307; 525/445
[58] Field of Search ............... 525/445; 528/303, 300, 528/274, 283, 306, 307; 260/22 CB

[56] References Cited

U.S. PATENT DOCUMENTS

2,253,681 8/1941 Bradley et al. ................. 260/22 CB
2,418,633 4/1947 Gould ............................ 260/22 CB
2,982,746 5/1961 Hart ................................ 260/22 CB

*Primary Examiner*—Lucille M. Phynes
*Attorney, Agent, or Firm*—Hubbell, Cohen, Stiefel & Gross

[57] ABSTRACT

A process for the preparation of an unsaturated polyester from a glycol and tetrahydrophthalic anhydride, maleic anhydride and/or fumaric acid, suitable for the production of an unsaturated polyester resin rapidly loosing its surface tackiness after cross-linking, and furnishing very flexible materials which are resistant to creasing, is described. The glycol employed has at least two ether bridges regularly alternated with —CH$_2$—CH$_2$— groups. The reaction is carried out in such a way as to obtain an alkyd essentially exempt from free tetrahydrophthalic anhydride. The resins thus prepared are adapted to the production of putties free from surface tackiness and having good finishing properties for application by spraying and/or by putty knife.

28 Claims, No Drawings

PROCESS FOR THE PREPARATION OF UNSATURATED POLYESTERS ADAPTED FOR THE PRODUCTION OF UNSATURATED POLYESTER RESINS

BACKGROUND OF THE INVENTION

1. Field of the Invention

The present invention relates to a process for the preparation of unsaturated polyesters from particular glycols and acids or anhydrides which comprise tetrahydrophthalic anhydride and/or acid, adapted to the preparation of unsaturated polyester resins which, after cross-linking, rapidly loose their surface tackiness, and which are adapted to the production of materials having high flexibility and resistance to creasing. The resins are further particularly adapted to make, by the addition of suitable fillers, putties that can be applied by spraying and/or by smearing with a putty knife. The present invention further refers to the unsaturated polyesters and the unsaturated polyester resins obtained by the aforesaid method, as well as to the aforesaid putties made from polyester resin and suitable fillers.

2. Prior Art

It is known that the oxygen in the air has an inhibiting effect on the cross-linking reaction, which occurs with a radicalic mechanism in the hardening of unsaturated polyester resins. The phenomenon is more or less accentuated depending on the type of resin. For many unsaturated polyester resins, the phenomenon has the consequence that a certain residual tackiness remains on the surface which is exposed to the air during the hardening and persists even after a long time. It is known to include certain additives in the unsaturated polyesters in an attempt to avoid such drawback. The use of such additives however causes other drawbacks, such as e.g. the inadequate adhesion of the finish varnishes.

SUMMARY OF THE INVENTION

The applicant has now surprisingly found that these disadvantages can be eliminated by preparing an unsaturated polyester resin from an unsaturated polyester which contains significant amounts of tetrahydrophthalic units but which is essentially exempt from free tetrahydrophthalic anhydride or acid. A preferred way of making such unsaturated polyesters is to carry out the process of their preparation in two different stages and to employ a particular class of glycols which will be specified hereinafter. From the unsaturated polyesters prepared according to the invention, unsaturated polyester resins are obtained which, after cross-linking, do not show surface tackiness, without the need of adding any additives. Furthermore, the unsaturated polyester resins thus prepared are particularly adapted to the production of putties for application by spraying and/or by putty knife, and, once cross-linked, they give rise to materials, in particular thin layer materials (films, etc.) which have a high flexibility and high resistance to creasing.

An object of the present invention is therefore a process for the preparation of unsaturated polyesters from glycols and maleic anhydride and/or fumaric acid and tetrahydrophthalic anhydride and/or tetrahydrophthalic acid, said unsaturated polyesters being adapted to the production of unsaturated polyester resins, which after cross-linking rapidly loose their surface tackiness and provide highly flexible and crease resistant materials, which process is characterized by the fact that glycols are employed which have at least two ether bridges regularly alternated with $-CH_2-CH_2-$ groups and that the reaction is carried out in two distinct stages. In particular, in the first stage 1 mol of the aforesaid glycol is reacted with from 0.4 to 0.8 mols of tetrahydrophthalic anhydride or acid, until a very low acidity has been reached, and successively, in a second stage, the product thus obtained, which is practically free from unreacted tetrahydrophthalic anhydride or acid, is reacted with from 0.2 to 0.6 mols of maleic anhydride and/or for fumaric acid.

According to the present invention tetraethylene glycol and/or triethylene glycol, more preferably triethylene glycol, is employed as glycol having at least two ether bridges regularly alternated with $-CH_2-CH_2-$ groups.

DETAILED DESCRIPTION OF THE PREFERRED EMBODIMENTS

The preferred unsaturated polyester, according to the present invention, is obtained by reacting 1 mol of triethylene glycol with 0.4 mols of tetrahydrophthalic anhydride until a very low acidity is reached, and subsequently the product thus obtained, which is exempt from free tetrahydrophthalic acid and/or anhydride, is reacted in a second stage with 0.6 mols of maleic anhydride and/or fumaric acid. According to the present invention, the glycol having at least two ether bridges regularly alternated with $-CH_2-CH_2-$ groups is reacted with the tetrahydrophthalic anhydride in the presence of conventional solvents, catalysts and inhibitors, at a temperature from about 160° to about 200° C., until an acid number between 0.5 and 7, preferably between 1 and 4, is reached. The reaction is conveniently effected under introduction of inert gas in order to lower more quickly the acid number. A xylene or a mixture of xylenes is conveniently used as an inert solvent.

At the end of the first stage, maleic anhydride and/or fumaric acid is introduced and the temperature is gradually brought to 200° C.

The second reaction stage is allowed to continue until an acid number of 40-45 is reached, whereafter the introduction of the inert gas is increased so as more rapidly to obtain the final acid number of 10-25 and preferably 16-18.

Alternatively, instead of the solvent, it is possible to apply a vacuum in the reactor whereby analogous results are obtained.

A polyesterification catalyst, a tin or lead salt may for example be used, as is usual for this type of reaction.

A polyvalent phenol, such as hydroquinone, may be employed, for example, as an inhibitor.

The unsaturated polyester thus obtained, which is also an object of the present invention, is suitably mixed with styrene, after adding the conventional inhibitors, for the purpose of preventing the premature crosslinking of the resin. The styrene is added, according to the present invention, preferably in an amount from 25 to 40% by weight of the total. The viscosity of the resin thus obtained, after adding the styrene, is about 500–900 cps at 25° C. Said unsaturated polyester resin, which is also an object of the present invention, exhibits, after cross-linking, a greater lack of surface tackiness and especially a greater wettability of the fillers during the production of putties, with respect to the conventional polyester resins.

The resins thus obtained, preferably suitably mixed with an amount from 15 to 50% by weight of a polyester resin of the rigid type reckoned on the total weight of the two resins, mineral fillers such as talc, calcium carbonate, atomized silica, barium sulphate, and conventional accelerators, leads to the formation of a putty adapted for spraying and/or application by putty knife, which at the moment of its use will be catalyzed with a radical forming initiator.

In this way a finished product is obtained which has, with respect to the conventional putties, the following advantages: more rapid disappearance of surface tackiness and possibility of a better surface finish of the putty by the use of emery paper.

A preferred rigid polyester resin which may be employed according to the present invention, is that obtained by cross-linking, with styrene, an unsaturated polyester made from a glycol (e.g. propylene glycol, neopentyl glycol or triethylene glycol) and at least an anhydride and/or an acid chosen among maleic anhydride, maleic acid, fumaric acid and phthalic anhydride.

As a radical forming initiator there may be employed, for instance, according to the present invention, methylethylketone peroxide or cyclohexane peroxide.

The aforesaid putties, adapted for application by spraying or by putty knife, are also an object of the present invention.

The following examples are illustrative and are not intended to limit the scope of the present invention.

EXAMPLE 1

The preparation of a flexible resin from tetrahydrophthalic anhydride and triethylenglycol exempt from free tetrahydrophthalic anhydride and/or acid is described.

950 kg of triethylene glycol
370 kg of tetrahydrophthalic anhydride
20 kg of xylene (mixture of the three isomers)
0.90 kg of stannous oxalate
0.45 kg of sodium acetate
0.011 kg of hydroquinone are introduced into stainless steel AISI 316 industrial reactor having the capacity of 3,000 liters, provided with a port for the introduction of the reagents, a mechanical vane stirrer with an antideflagrant electrical motor, a condenser, a steam heating jacket and a discharge for the products.

While the mixture is stirred and a nitrogen stream is passed therethrough, the temperature is brought to 160° C. After an hour at such a temperature, the mixture is heated to 190° C. and then to 200° C., while maintaining the flow of the nitrogen stream in order to bring the acid number of the unsaturated polyester to a value between 1 and 5 (mg of KOH per g of unsaturated polyester). At this point 360 kg of maleic anhydride are introduced, always maintaining the flow of the nitrogen stream. When the acid number, in this second phase of the process, has reached a value between 16 and 18, the mixture is allowed to cool. After the cooling, 280 g of quinone and 0.4 g of copper naphthenate are introduced as inhibitors, and 700 kg of styrene are introduced as well.

In this way a flexible resin is obtained which is adapted for the production of putties characterized by rapid loss of surface tackiness.

EXAMPLE 2

The preparation of a spray putty characterized by rapid loss of tackiness and good finishing properties is described.

70 part by weight of the resin prepared according to Example 1 and 30 parts by weight of a resin comprising a mixture of styrene and of rigid unsaturated polyester in a 30:70 ratio by weight, wherein the unsaturated polyester has been prepared from at least a glycol chosen among propylene glycol, neopentyl glycol and triethylene glycol, and from at least an anhydride and/or an acid chosen among maleic anhydride, maleic acid, fumaric acid and phthalic anhydride, are intimately mixed until an homogeneous mixture has been obtained. Suitable fillers and additives are added to said mixture according to the following formulation:

Mixture of the aforesaid two resins—40 parts by weight
Ethyl acetate—10 parts by weight
Styrene—10 parts by weight
Micronized silica—2 parts by weight
Calcium carbonate—10 parts by weight
Talc—10 parts by weight
Barium sulphate—10 parts by weight
Cobalt octoate (containing 6% of Co in dibutyl phthalate)—2 parts by weight Said mixture is passed through a three cylinder calender, while adding 6 more parts by weight of ethyl acetate. A putty is thus obtained which is adapted for application by spraying. It may be stored for a long time at room temperature in rust free and hermetically closed containers. Two parts by weight of cyclohexane peroxide are added as cross-linking initiator at the moment of using the putty.

When the putty is sprayed on a metallic substrate, such as e.g. a steel sheet, a surface layer is obtained which has a completely dry surface (lacking of tackiness) and which may be finished by rubbing it with emery paper after standing for 2–3 hours from its application, at temperature comprised between 15° and 30° C.

We claim:
1. A process for the preparation of an unsaturated polyester comprising a two stage reaction, wherein in the first stage a glycol having at least two ether bridges regularly alternated with —CH$_2$—CH$_2$—groups is reacted with either tetrahydrophthalic anhydride or tetrahydrophthalic acid to produce a product substantially free from either unreacted tetrahydrophthalic anhydride or unreacted tetrahydrophthalic acid, and subsequently, reacting in the second stage the product of the first stage with either maleic anhydride or fumaric acid.

2. A process for the preparation of an unsaturated polyester comprising reacting a glycol having at least two ether bridges regularly alternated with —CH$_2$—CH$_2$—groups with either tetrahydrophthalic anhydride or tetrahydrophthalic acid and a compound selected from the group consisting of maleic anhydride and fumaric acid; the reaction being carried out so that said unsaturated polyester is substantially free of either tetrahydrophthalic anhydride or tetrahydrophthalic acid in free form.

3. A process according to claim 2, wherein the reaction is carried out in two distinct stages comprising a first stage and a second stage, wherein in said first stage one mole of said glycol is reacted with from 0.4 to 0.8 moles of either tetrahydrophthalic anhydride or tetrahydrophthalic acid until a very low acidity is reached so as to produce a product substantially free from either unreacted tetrahydrophthalic anhydride or untreated tetrahydrophthalic acid, and subsequently in said second stage the product produced in said first stage is reacted with from 0.2 to 0.6 moles of either maleic anhydride or fumaric acid.

4. A process according to any of claims 1, 2 or 3, wherein said glycol is selected from the group consisting of triethylene glycol and tetraethylene glycol.

5. A process according to either claim 2 or 3, wherein said glycol is triethylene glycol.

6. A process according to any of claims 1, 2 or 3, wherein for each mole of glycol 0.4 moles of tetrahydrophthalic anhydride are employed and 0.6 moles of maleic anhydride are employed.

7. A process according to either claim 1 or 3, wherein said first stage is carried out at a temperature of about 160°-200° C. until an acid number between 0.5 and 7 is reached.

8. A process according to either claim 1 or 3, wherein said first stage is carried out at a temperature of about 160°-200° C. until an acid number between 1 and 4 is reached.

9. A process according to claim 7, wherein the reaction in said first stage is carried out under a strong introduction of an inert gas so as to more quickly lower the acid number.

10. A process according to claim 9, wherein at the end of said first stage maleic anhydride is introduced while gradually raising the temperature to 200° C. and then allowing the reaction to proceed until an acid number of 40-45 is reached, whereafter the introduction of inert gas is increased so as to more rapidly obtain a final acid number of 10-25.

11. A process according to claim 10, wherein said final acid number is 16-18.

12. A process according to either claim 1 or 3, wherein said first and second stage reactions are carried out in the presence of a solvent.

13. A process according to claim 12, wherein said solvent is a xylene or mixtures of xylenes.

14. A process according to either claim 1 or 3, wherein said first and second stage reactions are carried out in the presence of a catalyst.

15. A process according to claim 14, wherein said catalyst is selected from the group consisting of a tin salt and a lead salt.

16. A process according to either claim 1 or 3, wherein said first and second stage reactions are carried out in the presence of an inhibitor.

17. A process according to claim 16, wherein said inhibitor is a polyvalent phenol.

18. A process according to claim 17, wherein said polyvalent phenol is hydroquinone.

19. An unsaturated polyester produced according to the process of any of claims 1, 2, 3, 9, 10 or 11.

20. A cross-linking process comprising mixing the unsaturated polyester described in claim 10 with styrene and adding to the mixture a peroxide-based cross-linking initiator thereby producing a cross-linked tack-free unsaturated polyester resin.

21. A process according to claim 20, wherein an inhibitor is added to said alkyd prior to the addition of the styrene and the peroxide-based cross-linking initiator.

22. A process according to claim 20, wherein said peroxide-based cross-linking initiator is selected from the group consisting of methylethylketone peroxide and cyclohexane peroxide.

23. A process according to claim 20, wherein the styrene is employed in an amount from 25 to 40 percent by weight of the total.

24. A cross-linking tack-free polyester resin produced by the process described in claim 20.

25. A cross-linked tack-free polyester resin produced by the process described in claim 23.

26. A process for the preparation of putties comprising producing a mixture comprising the unsaturated polyester resin described in claim 24, a mineral type filler, additives and accelarators, and catalyzing said mixture prior to use with a radical forming initiator.

27. A process according to claim 25, wherein 15 to 50 percent of an unsaturated polyester resin is employed in said mixture.

28. Putties for spraying and application by a putty knife, free from surface tackiness and having good finishing properties, produced according to the process described in claim 26.

* * * * *